(12) United States Patent
Iwabuchi et al.

(10) Patent No.: US 10,759,232 B2
(45) Date of Patent: Sep. 1, 2020

(54) TIRE

(71) Applicant: BRIDGESTONE CORPORATION, Tokyo (JP)

(72) Inventors: Sotaro Iwabuchi, Tokyo (JP); Shiho Kamada, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/073,079

(22) PCT Filed: Jan. 26, 2017

(86) PCT No.: PCT/JP2017/002743
§ 371 (c)(1),
(2) Date: Jul. 26, 2018

(87) PCT Pub. No.: WO2017/131091
PCT Pub. Date: Aug. 3, 2017

(65) Prior Publication Data
US 2019/0047331 A1 Feb. 14, 2019

(30) Foreign Application Priority Data

Jan. 28, 2016 (JP) ................................. 2016-014573

(51) Int. Cl.
*B60C 13/00* (2006.01)
*B60C 13/02* (2006.01)
(Continued)

(52) U.S. Cl.
CPC .......... *B60C 13/001* (2013.01); *B29C 33/424* (2013.01); *B29D 30/72* (2013.01);
(Continued)

(58) Field of Classification Search
CPC .................................................... B60C 13/001
See application file for complete search history.

(56) References Cited

U.S. PATENT DOCUMENTS

D91,484 S * 2/1934 Flynn ........................... D12/571
2009/0218019 A1 9/2009 Paturle
(Continued)

FOREIGN PATENT DOCUMENTS

CN         201756042 U      3/2011
CN         104995042 A      10/2015
(Continued)

OTHER PUBLICATIONS

Machine Translation: JP-08318717-A; Kikuchi, Shinobu; (Year: 2019).*

(Continued)

*Primary Examiner* — Kendra Ly
(74) *Attorney, Agent, or Firm* — Oliff PLC (57) ABSTRACT

A tire includes: a pattern portion, in which plural ridges having ridgelines are arranged adjacent to each other, on a tire surface, the ridgelines including a main body portion and a first extending portion and a second extending portion that extend in different directions from the main body portion in plan view, in which the first extending portion of a ridge and the second extending portion of an adjacent ridge at least partially overlap each other when viewed from a direction orthogonal to an adjacent direction of the ridges, a height of the ridge is from 0.2 mm to 0.5 mm, and ridges adjacent to each other are arranged at a constant pitch of from 0.15 mm to 0.35 mm.

9 Claims, 7 Drawing Sheets

(51) Int. Cl.
  *B29C 33/42* (2006.01)
  *B29D 30/72* (2006.01)
  *B60C 11/13* (2006.01)
(52) U.S. Cl.
  CPC ........ *B60C 13/02* (2013.01); *B29D 2030/726* (2013.01); *B60C 2011/1361* (2013.01)

(56) References Cited

U.S. PATENT DOCUMENTS

| | | |
|---|---|---|
| 2010/0200135 A1 | 8/2010 | Ohara |
| 2012/0273101 A1 | 11/2012 | Iwabuchi |
| 2015/0314652 A1 | 11/2015 | Iwabuchi |
| 2015/0314653 A1 | 11/2015 | Iwabuchi |
| 2015/0360520 A1 | 12/2015 | Ito |
| 2019/0030959 A1 | 1/2019 | Iwabuchi |

FOREIGN PATENT DOCUMENTS

| | | |
|---|---|---|
| CN | 108495757 A | 9/2018 |
| EP | 3409509 A1 | 12/2018 |
| JP | 08318717 A * | 12/1996 |
| JP | H11-291722 A | 10/1999 |
| JP | 2001-055011 A | 2/2001 |
| JP | 2001-206024 A | 7/2001 |
| JP | 2005119614 A * | 5/2005 |
| JP | 2009-512584 A | 3/2009 |
| JP | 2011-116306 A | 6/2011 |
| JP | 2011-126335 A | 6/2011 |
| JP | 2011-225026 A | 11/2011 |
| JP | 2015-168431 A | 9/2015 |
| WO | 2017/131019 A1 | 8/2017 |

OTHER PUBLICATIONS

Machine Translation: JP-2005119614-A; Nomura, Seiji; (Year: 2020).*
Nov. 14, 2018 Extended European Search Report issued in European Patent Application No. 17744321.5.
May 9, 2017 International Search Report issued in International Patent Application No. PCT/JP2017/002743.
Dec. 23, 2019 Search Report issued in Chinese Patent Application No. 201780009089X.

* cited by examiner

TIRE

TECHNICAL FIELD

The present disclosure relates to a tire on which representation such as characters are formed.

BACKGROUND ART

Japanese National-Phase Publication (JP-A) No. 2009-512584 discloses a technique in which a pattern portion constituted by a plurality of protrusions is formed on a surface of a tire side portion to generate a contrast between the pattern portion and a smooth portion adjacent to the pattern portion, thereby improving visibility of the pattern portion.

SUMMARY OF INVENTION

Technical Problem

Furthermore, the technology disclosed in JP-A No. 2009-512584 tends to be difficult to make rubber flow into holes for forming the protrusions which are provided in a mold at the time of molding and to secure moldability of the protrusions. In addition, the protrusions to be molded are fibrous and it is difficult to secure resistance against abrasion.

In consideration of the above facts, the disclosure aims to provide a tire having excellent moldability and durability of a pattern portion constituted by a plurality of protrusions while suppressing reflection of light incident on the pattern portion from each direction.

Solution to Problem

A tire of a first aspect of the disclosure includes a pattern portion, in which a plurality of ridges having ridgelines are arranged adjacent to each other, the ridgelines including a main body portion and a first extending portion and a second extending portion that extend in different directions from the main body portion in plan view, wherein the first extending portion of a ridge and the second extending portion of an adjacent ridge at least partially overlap each other when viewed from a direction orthogonal to an adjacent direction of the ridges, a height of the ridges is from 0.2 mm to 0.5 mm, and ridges adjacent to each other are arranged at a constant pitch of from 0.15 mm to 0.35 mm.

In the tire of the first aspect of the disclosure, the pattern portion in which the plurality of ridges whose ridgelines include the main body portion and the first extending portion and the second extending portion that extend in different direction from the main body portion in plan view are arranged is formed adjacent to each other. Here, the "tire surface" refers to a surface visible from the outside of the tire, such as a tire side portion, a tread portion, a groove bottom of a tread, or a groove wall. In addition, the tire includes both of a pneumatic tire and a non-pneumatic tire (so-called solid tire). It is to be noted that the term "ridge" refers to a protruding portion extending to be elongated along the tire surface. In addition, the "extending in different directions" includes a state in which the first extending portion and the second extending portion extend from the main body portion along two linear lines which are not parallel to each other or a curved line and a state in which the first extending portion and the second extending portion extend in different directions when viewed from the main body portion along the linear lines parallel to each other.

In the pattern portion, a plurality of ridges having a height dimension of from 0.2 mm to 0.5 mm are arranged adjacent to each other, and the ridges adjacent to each other are arranged at a pitch of from 0.15 mm to 0.35 mm. For this reason, when light is incident between the wall surfaces of the adjacent ridges, the light is repeatedly reflected between the wall surfaces and is gradually attenuated. In this way, it is possible to suppress reflection of the light incident to the pattern portion. The pitch between the ridges in the disclosure means intervals between ridgelines of locations where adjacent ridges are closest to each other, and does not mean intervals (for example, center-to-center distances between each of the adjacent ridges) where adjacent ridges are arranged.

Since the ridges adjacent to each other are arranged at a constant pitch, unevenness of reflected light is less likely to occur, as compared with, for example, a case in which the pitches are uneven. Further, the ridges can be densely arranged. In addition, since the ridges adjacent to each other have overlapping portions when viewed from a direction orthogonal to the adjacent direction of the ridge, the ridges can be densely arranged along the adjacent direction of the ridge. For this reason, an effect of suppressing the reflection of the light is enhanced.

In addition, the ridgelines of the ridges are configured to include the first extending portions and the second extending portions extending in different directions from the main body portion in plan view. For this reason, the ridges can efficiently attenuate light incident from different directions. As a result, reflection of light from a plurality of directions can be suppressed.

Further, since the pattern portions are constituted by the ridges, rubber easily flows into a mold for molding the tire as compared with, for example, a case in which the pattern portions are constituted by fibrous protrusions. Therefore, the pattern portion is excellent in moldability. In addition, the ridges are higher in rigidity, and are less vulnerable to external forces, as compared with the fibrous protrusions Therefore, the pattern portion is excellent in durability.

In a tire according to a second aspect of the disclosure, in the tire according to the first aspect, the angle formed by the wall surfaces constituting the ridges and facing each other is set to be from 15° to 40°.

According to the tire of the second aspect of the disclosure, when the angle formed by the wall surfaces is larger than 15°, a ratio in which reflected light from the wall surfaces returns from a space between the ridges to the outside is increased, such that improvement of visibility is suppressed. That is, the light is reflected, such that a difference in contrast with the bright portion is reduced, thereby suppressing the improvement of the visibility. Meanwhile, when the angle θ is smaller than 15°, the ridges easily collapse.

In a tire according to a third aspect of the disclosure, in the tire according to the first and second aspects, the first extending portion of one of the ridges adjacent to each other and the second extending portion of the other of the ridges adjacent to each other at least partly overlap with each other when viewed from the direction along the adjacent direction of the ridge.

According to the tire of the third aspect of the disclosure, the first extending portion of one of the ridges adjacent to each other and the second extending portion of the other of the ridges adjacent to each other have the overlapping portion when viewed from the direction along the adjacent direction of the ridge and the direction orthogonal to the adjacent direction of the ridge. Therefore, the ridges adjacent to each other are arranged in an interlacing manner, and the density of the ridges in the pattern portion is higher, as compared with a case in which the ridges do not have the overlapping portion when viewed from the direction along the adjacent direction of the ridge. For this reason, an effect of suppressing the reflection of the light is enhanced.

In a tire according to a fourth aspect of the disclosure, the first extending portion and the second extending portion each have a shape having a bending point, and extend in opposite directions from each other from the bending point to a tip.

According to the tire of the fourth aspect of the disclosure, the first extending portion and the second extending portion extend in the opposite directions from each other. Therefore, as compared with a case in which the first extending portion and the second extending portion extend in the same direction, the density of the ridges is increased, and the effect of suppressing the reflection of light is enhanced.

Advantageous Effects of Invention

According to the disclosure, it is possible to provide the tire having the excellent moldability and durability while suppressing the reflection of light.

DESCRIPTION OF EMBODIMENTS

First Embodiment

Figure 1:
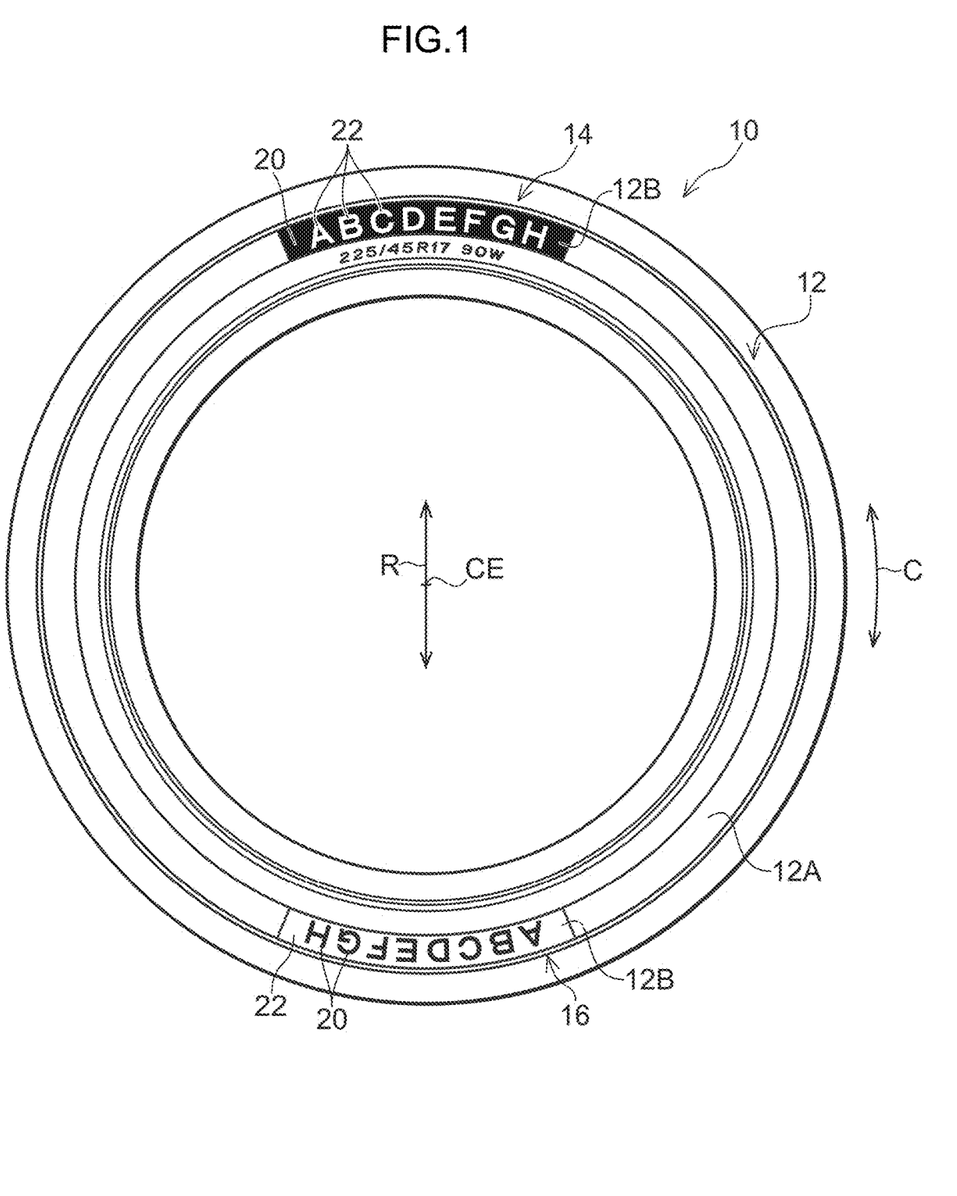
FIG. 1 is a side view of a tire according to an embodiment of the disclosure.

Hereinafter, a first embodiment of the disclosure will be described with reference to the drawings. In FIG. 1, a side view of a tire 10 according to the present embodiment is shown. In the present embodiment, C refers to a circumferential direction of the tire, and R refers to a radial direction of the tire. The tire 10 may be a pneumatic tire or may be a non-pneumatic tire.

(Mark Portion)

A first mark portion 14 and a second mark portion 16 that form representation are formed on a tire side portion 12 (decorative portion) which configures a tire surface. The first mark portion 14 and the second mark portion 16 have belt-like arc shapes, and are formed symmetrically with respect to a center axis CE of the tire. In addition, the first mark portion 14 and the second mark portion 16 have dark portions 20 looking black in appearance and bright portions 22 looking brighter than the dark portions 20, respectively. It is preferable that the first mark portion 14 and the second mark portion 16 are arranged outside a maximum width portion (that is, a part in which a linear distance between the tire side portions is the maximum) of the tire in the radial direction of the tire.

In the first mark portion 14 provided on an upper side of the page space of FIG. 1, the bright portion 22 is configured by characters such as "ABCDEFGH" formed of a smooth surface, and the dark portion 20 is formed at an outer circumferential portion of the bright portion 22. The dark portion 20 is a kind of decorative band, and is formed so as to surround the characters formed by the bright portion 22.

Meanwhile, in the second mark portion 16 provided on a lower side of the page space of FIG. 1, characters such as "ABCDEFGH" are formed by the dark portion 20, and an outer circumferential portion of the dark portion 20 is configured by the bright portion 22. In the second mark portion 16, the bright portion 22 configures a kind of decorative band, and is provided so as to surround the characters formed by the dark portion 20. The bright portion 22 is configured by a smooth surface like a general surface 12A which configures a surface of the tire side portion 12 other than the mark portion, and the bright portion 22 is configured by a step surface 12B recessed inward from the general surface 12A.

Figure 2:
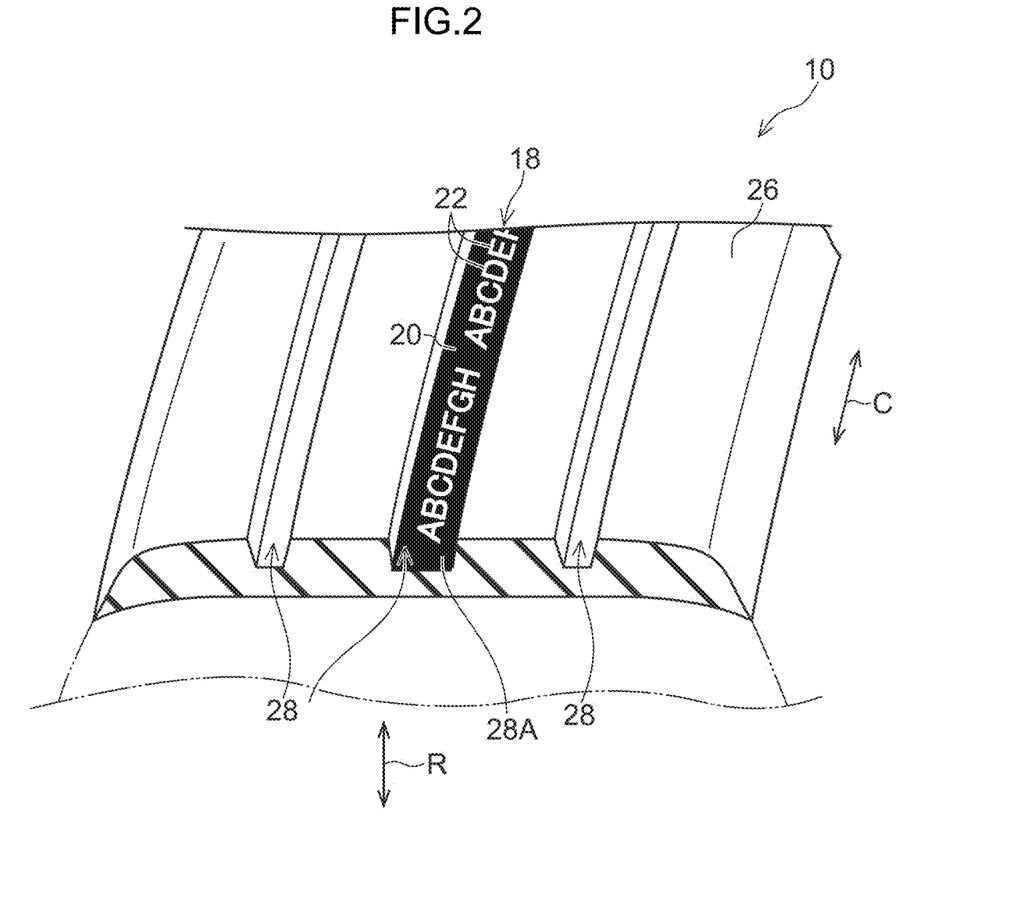
FIG. 2 is a partial perspective cross-sectional view of a tread of the tire according to the embodiment of the disclosure.

In addition, the tire 10 includes a tread 26 at an outer side in the radial direction R of the tire, as shown in FIG. 2. In the tread 26, a plurality of circumferential grooves 28 are formed. A third mark portion 18 forming representation is formed on a groove bottom 28A (decorative portion) of the circumferential grooves 28 which configures the tire surface. The third mark portion 18 has a belt-like shape, and is formed on a part of the circumferential groove 28. The third mark portion 18 also has a dark portion 20 looking black in appearance and a bright portion 22 looking brighter than the dark portion 20.

In the third mark portion 18, the bright portion 22 is configured by characters such as "ABCDEFGH" formed of a smooth surface, and the dark portion 20 is formed at an outer circumferential portion of the bright portion 22. The dark portion 20 is a kind of decorative band, and is formed so as to surround the characters formed by the bright portion 22.

The first mark portion 14, the second mark portion 16, and the third mark portion 18 including the dark portions 20 can be formed by providing corresponding protrusions and recesses in a mold of the tire 10 by laser processing.

(Pattern Portion)

Figure 3:
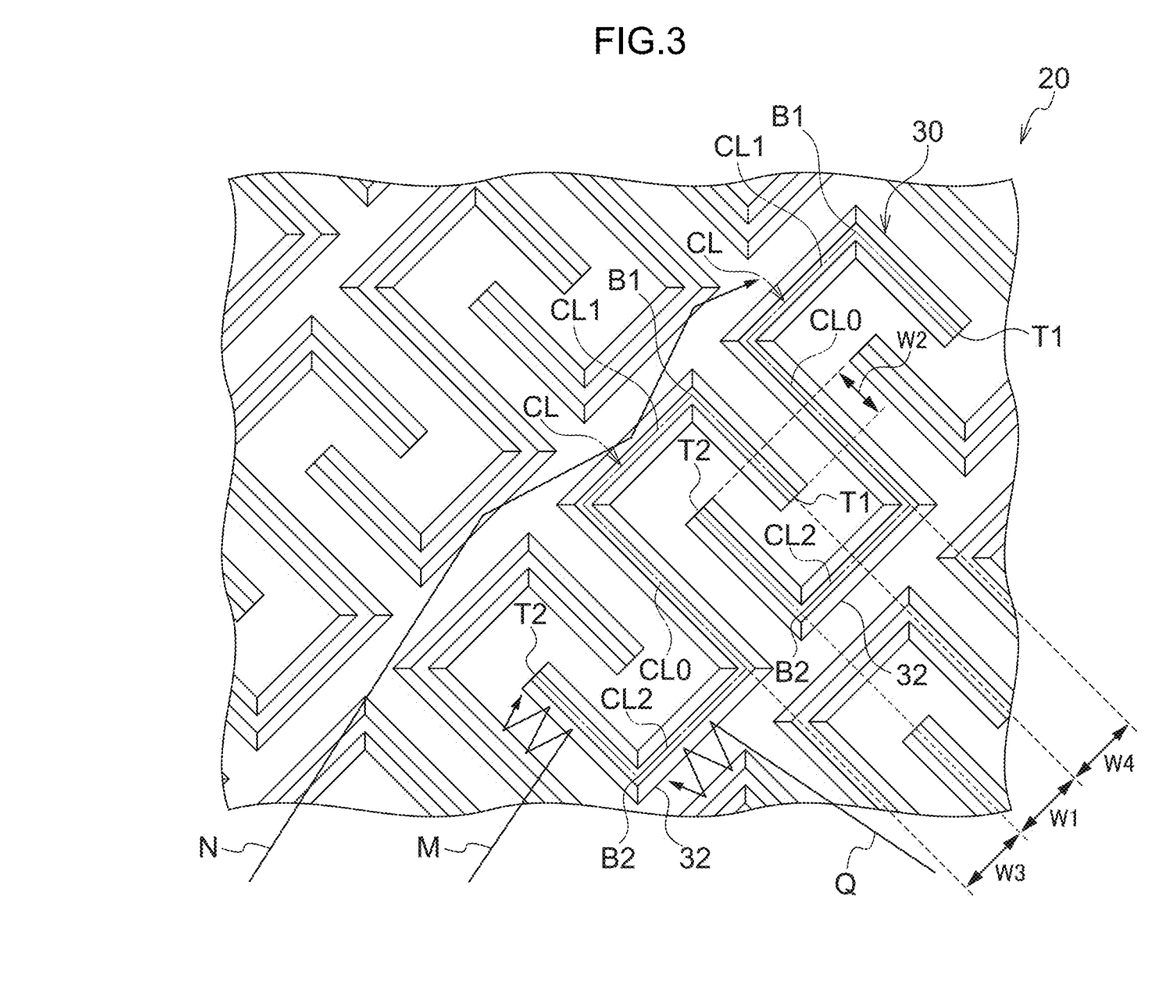
FIG. 3 is a plan view showing an example of a dark portion of a tire according to a first embodiment of the disclosure.

The dark portion 20 of the first mark portion 14 is constituted by a pattern portion 30 formed on a step surface 12B recessed inward from the general surface 12A (see FIG. 1) of the tire side portion 12, as shown in FIG. 3. In the pattern portion 30, a plurality of ridges 32, in which ridgelines CL include main body portions CL0 and first extending portions CL1 and second extending portions CL2 extending in different directions from the main body portions, are arranged adjacent to each other.

The main body portion CL0 of the ridgeline CL has a linear shape, and the first extending portion CL1 extends in a direction orthogonal to the main body portion CL0 from one end portion. In addition, the second extending portion CL2 extends in a direction orthogonal to the main body portion CL0 and in a direction opposite to the first extending portion CL1 from the other end portion. The first extending portion CL1 and the second extending portion CL2 each have an L-letter shape having bending points B1 and B2 and extend parallel to the main body portion CL0 and in an opposite to each other from the bending points B1 and B2 to tips T1 and T2. The first extending portion CL1 and the second extending portion CL2 are formed to be point symmetrical with respect to a center point of the main body portion CL0.

The ridges 32 are arranged adjacent to each other in the direction orthogonal to the main body portion CL0 of the ridgeline CL. The first extending portion CL1 of the one ridge 32 adjacent to each other and the second extending portion CL2 of the other ridge 32 have an overlapping portion when viewed from the direction (that is, the direction along the tire surface and the direction along the main body portion CL0 of the ridgeline CL) orthogonal to the adjacent direction of the ridge. Specifically, the first extending portion CL1 of the one ridge 32 and the second extending portion CL2 of the other ridge 32 overlap each other in a region indicated by a width W1 in FIG. 3.

Further, when the ridge 32 is viewed from the direction (that is, the direction along the tire surface and the direction orthogonal to the main body portion CL0 of the ridgeline CL) along the direction in which the ridges 32 are adjacent to each other, the first extending portion CL1 and the second extending portion CL2 overlap each other in a region indicated by a width W2 in FIG. 3. Further, the first extending portion CL1 (in other words, the portion extending from the bending point B1 to the tip T1) of one of the ridges 32 adjacent to each other and the second extending portion CL2 (in other words, the portion from the bending point B2 to the tip T2) of the other of the ridges adjacent to each other have the overlapping portion (that is, the region indicated by the width W2 in FIG. 3) when viewed from the direction along the adjacent direction of the ridge. In the present embodiment, the width W2 is formed to be smaller than a length of the main body portion CL0.

A ridgeline interval between the main body portion CL0 of one of the ridges 32 adjacent to each other and the second extending portion CL2 (in other words, the portion from the bending point B2 to the tip T2) of the other of the ridges 32 adjacent to each other is set to be a width W3. In addition, the ridgeline interval between the first extending portion CL1 (in other words, the portion from the bending point B1 to the tip T1) of the one ridge 32 and the second extending portion CL2 (in other words, the portion from the bending point B2 to the tip T2) of the other ridge 32 is set to be the width W1. The ridgeline interval between the first extending portion CL1 (in other words, the portion from the bending point B1 to the tip T1) of the one ridge 32 and the main body portion CL0 of the other ridge 32 is set to be a width W4. In the present embodiment, the width W3=W1=W4, and the widths W3, W1, and W4 each coincide with the pitches P between the ridges 32.

Although the width W3=W1=W4 in the present embodiment, the embodiment of the disclosure is not limited thereto. For example, the widths W3, W1, and W4 may have a magnitude relation. In this case, the smallest one of the widths W3, W1, and W4 is defined as the pitch P between the ridges 32.

Other dark portions 20 of the second mark portion 16 and the third mark portion 18 also have the same structure. The same goes for the following description.

(Ridge)

Figure 6:
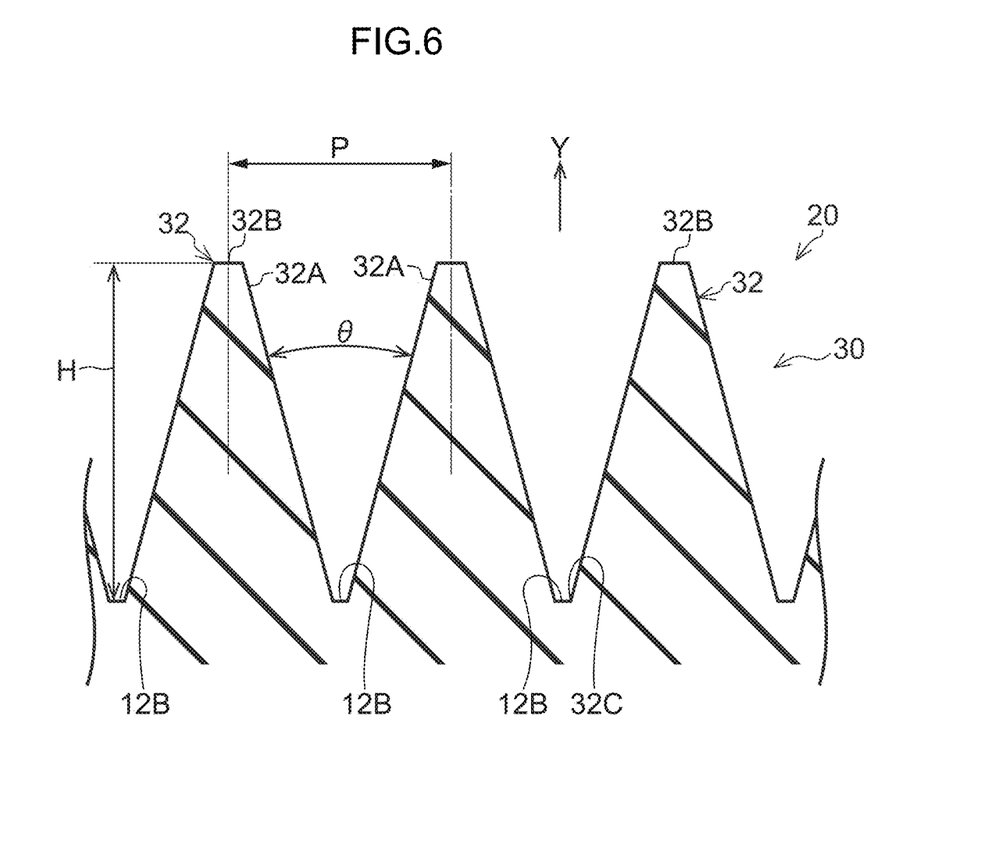
FIG. 6 is an enlarged cross-sectional view of a first ridge constituting the dark portion according the embodiment of the disclosure.

As shown in FIG. 6, wall surfaces 32A of both sides of the ridge 32 are inclined with respect to a protruding direction (a direction shown by an arrow Y in FIG. 6) so that an interval between the wall surfaces 32A of both sides of the ridge 32 is gradually increased from a top portion 32B toward a base portion 32C when viewed from a cross section in a direction orthogonal to an extending direction of the ridge 32. Further, in the present embodiment, the wall surfaces 32A of the ridge 32 continuously extend in a straight line shape from the top portion 32B to the base portion 32C. It should be noted that the "base portion 32C" mentioned herein refers to a boundary part between the ridge 32 and the step surface 12B.

The top portion 32B is a flat surface when viewed from the cross section in the direction orthogonal to the extending direction of the ridge 32, and a height H of the ridge 32, that is, a dimension of the ridge 32 from the top portion 32B to the step surface 12B in the radial direction of the tire is set to be from 0.3 mm to 0.4 mm.

It should be noted that a case in which the height H of the ridge 32 is set to be from 0.3 mm to 0.4 mm is described in the present embodiment, but the embodiment of the disclosure is not limited thereto. For example, this height H can be in a range from 0.2 mm to 0.5 mm, and it is possible to obtain a predetermined effect as long as the height H is in this range.

The dark portion 20 is configured to look dark by repeatedly reflecting and attenuating light between a wall surface 32A of one ridge 32 and a wall surface 32A of another ridge 32, in a space between adjacent ridges 32.

In this case, when the height H of the ridge 32 is less than 0.3 mm, an effect in which the dark portion 20 looks black starts to be decreased, and when the height H is less than 0.2 mm, this effect is significantly decreased. Meanwhile, when the height H of the ridge 32 exceeds 0.4 mm, it is easy for the ridge 32 to be deformed due to an external force, and when the height H exceeds 0.5 mm, it is difficult to ensure moldability in a manufacturing process.

For this reason, it is preferable that the height H of the ridge 32 is set to be from 0.2 mm to 0.5 mm and it is more preferable that the height H is set to be from 0.3 mm to 0.4 mm.

Pitches P between adjacent ridges 32 are set to be equidistant pitches from 0.2 mm to 0.3 mm.

It should be noted that a case in which the pitch P between the ridges 32 is set to be from 0.2 mm to 0.3 mm is described in the present embodiment, but the embodiment of the disclosure is not limited thereto. For example, the pitch P can be in a range from 0.15 mm to 0.35 mm, and it is possible to obtain a predetermined effect as long as the pitch P is in this range.

The dark portion 20 is configured to look black by darkening the space between the adjacent ridges 32. However, when the pitch P between the adjacent ridges 32 exceeds 0.3 mm, an effect in which the dark portion 20 looks black due to the space between the ridges 32 starts to be decreased, and when the pitch P exceeds 0.35 mm, this effect is significantly decreased. Further, when the pitch P is less than 0.15 mm, it is difficult to ensure moldability at the time of manufacturing.

For this reason, it is preferable that the pitch P between the adjacent ridges 32 is set to be from 0.15 mm to 0.35 mm, and it is more preferable that the pitch P is set to be from 0.2 mm to 0.3 mm.

The wall surfaces 32A of both sides of the ridge 32 are inclined, and an angle θ formed by facing wall surface 32A in the adjacent ridges 32 is set to be from 15° to 40°. It is more preferable that the angle θ is set to be from 15° to 30°.

Here, when the angle θ formed by the wall surfaces 32A of the ridges 32 is less than 15°, it is easy for the ridges 32 to be deformed and collapse. Meanwhile, when the angle θ formed by the wall surfaces 32A of the ridges 32 exceeds 30°, a ratio in which reflected light from the wall surfaces 32A is emitted from the dark portion 20 is increased, and when the angle θ exceeds 40°, a ratio in which reflected light from the wall surfaces 32A is emitted from the dark portion 20 is significantly increased.

For this reason, it is preferable that the angle θ formed by the wall surfaces 32A of the adjacent ridges 32 is set to be from 15° to 40°, and it is more preferable that the angle θ is set to be from 15° to 30°.

(Action and Effect)

Next, an action and effect of the tire according to the present embodiment will be described. On the tire side portion 12 or the groove bottom 28A of the circumferential groove 28 of the tread 26, the first mark portion 14, the second mark portion 16, and the third mark portion 18 that form the mark are provided. The dark portion 20 constituting the first mark portion 14, the second mark portion 16, and the third mark portion 18 is constituted by the pattern portion 30 in which the ridges 32 which have a height H of from 0.3 mm to 0.4 mm and have ridgelines CL are arranged adjacent to each other, the ridgeline including the main body portion CL0 and the first extending portion CL1 and the second extending portion CL2 that extend in different directions from the main body portion.

Therefore, for example, when light is incident from a direction close to a direction orthogonal to the main body portion CL0 of the ridge 32, as shown by an arrow M in FIG. 3, the number of reflections of light is increased between the wall surfaces 32A of the portion where the ridgeline CL is parallel to the main body portion CL0 and thus the light is attenuated, such that the pattern portion 30 looks black. On the other hand, as shown by an arrow N in FIG. 3, the number of reflections of light is decreased between the wall surfaces 32A of the portion where the ridgeline CL is orthogonal to the main body portion CL0.

In addition, as shown by the arrow Q in FIG. 3, for example, when light is incident from the direction close to the direction along the main body portion CL0 of the ridge 32, the number of reflections of light is increased between the wall surfaces 32A of the portion orthogonal to the main body portion CL0 of the first extending portion CL1 and the second extending portion CL2 and thus the light is attenuated, such that the pattern portion 30 looks black.

As described above, since the ridges 32 have the ridgelines extending in different directions, in the dark portion 20 having the pattern portion 30, it is possible to suppress the reflection of light incident on the tire 10 from each direction. As a result, since the pattern portion looks black even when viewed from various angles, the visibility is improved.

In addition, the pitches P between the adjacent ridges 32 are configured to be equidistant from 0.2 mm to 0.3 mm. For this reason, as compared with a case in which the ridges 32 are arranged so that adjacent intervals therebetween are uneven, the ridges 32 can be densely arranged. This makes it possible to make the dark portion 20 look black.

Further, the width W3 which is the ridgeline interval between the main body portion CL0 of one of the ridges 32 adjacent to each other and the second extending portion CL2 (in other words, the portion from the bending point B2 to the tip T2) of the other of the ridges 32 adjacent to each other, the width W1 which is the ridgeline interval between the first extending portion CL1 (in other words, the portion from the bending point B1 to the tip T1) of the one ridge 32 and the second extending portion CL2 (in other words, the portion from the bending point B2 to the tip T2) of the other ridge 32, and the width W4 which is the ridgeline interval between the first extending portion CL1 (in other words, the portion from the bending point B1 to the tip T1) of the one ridge 32 and the main body portion CL0 of the other ridge 32 each have the same dimension. Therefore, the ridgelines CL extending in the direction orthogonal to the adjacent direction of the ridge are arranged in the pattern portion 30 at regular intervals along the direction adjacent to the ridge 32. As a result, the unevenness of reflected light can be suppressed.

The wall surfaces 32A of the ridge 32 are inclined, and the angle θ formed by the facing wall surface 32A in the adjacent ridges 32 is set to be from 15° to 40°. For this reason, the mold is easily removed during the manufacturing of the tire and the moldability is improved. As a result, the possibility of collapse of the ridges is reduced, and the durability of the ridges is improved.

When the angle formed by the wall surfaces is larger than 15°, a ratio in which the reflected light from the wall surfaces returns from a space between the ridges to the outside is increased, such that improvement of visibility is suppressed. That is, the light is reflected, such that a difference in contrast with the bright portion is reduced, thereby suppressing the improvement of the visibility. Meanwhile, when the angle θ is smaller than 15°, the ridges easily collapse.

In addition, the top portions 32B and 42B of the ridges 32 and 42 are flat surfaces. Therefore, the rigidity of the top portions 32B and 42B is high as compared with a case in which the flat surface is not formed, and the durability of the ridges 32 and 42 is improved.

In the present embodiment, the top portions 32B of the ridges 32 are flat surfaces, but the embodiment of the disclosure is not limited thereto, and for example, the top portions 32B of the ridges 32 may be vertices of a sharp shape. For this reason, as compared with a case in which the top portion 32B is formed as a flat surface, it is possible to suppress the reflected light from being directly viewed. For this reason, it is possible to improve the visibility by increasing a contrast of the pattern portions 30. Alternatively, the top portions 32B may be a curved shape such as a circular arc. It is possible to suppress the reflected light from being directly viewed even though the top portions 32B have the curved shape.

In the above-described embodiment, only a case in which the wall surface 32A of the ridge 32 extends linearly as shown in FIG. 6 has been described, but the embodiment of the disclosure is not limited thereto, and the wall surface may extend in a curved line or may be bent in a polygonal line shape, a zigzag shape, or the like. In this case, light is scattered between the wall surfaces 32A as compared with a case in which the wall surfaces 32A extend in the linear shape. Therefore, it is possible to approximate the appearance of the reflected light between the wall surface 32A of the portion where the ridgeline is parallel to the main body portion CL0 and the wall surface 32A of the portion perpendicular to the main body portion CL0.

Figure 7:
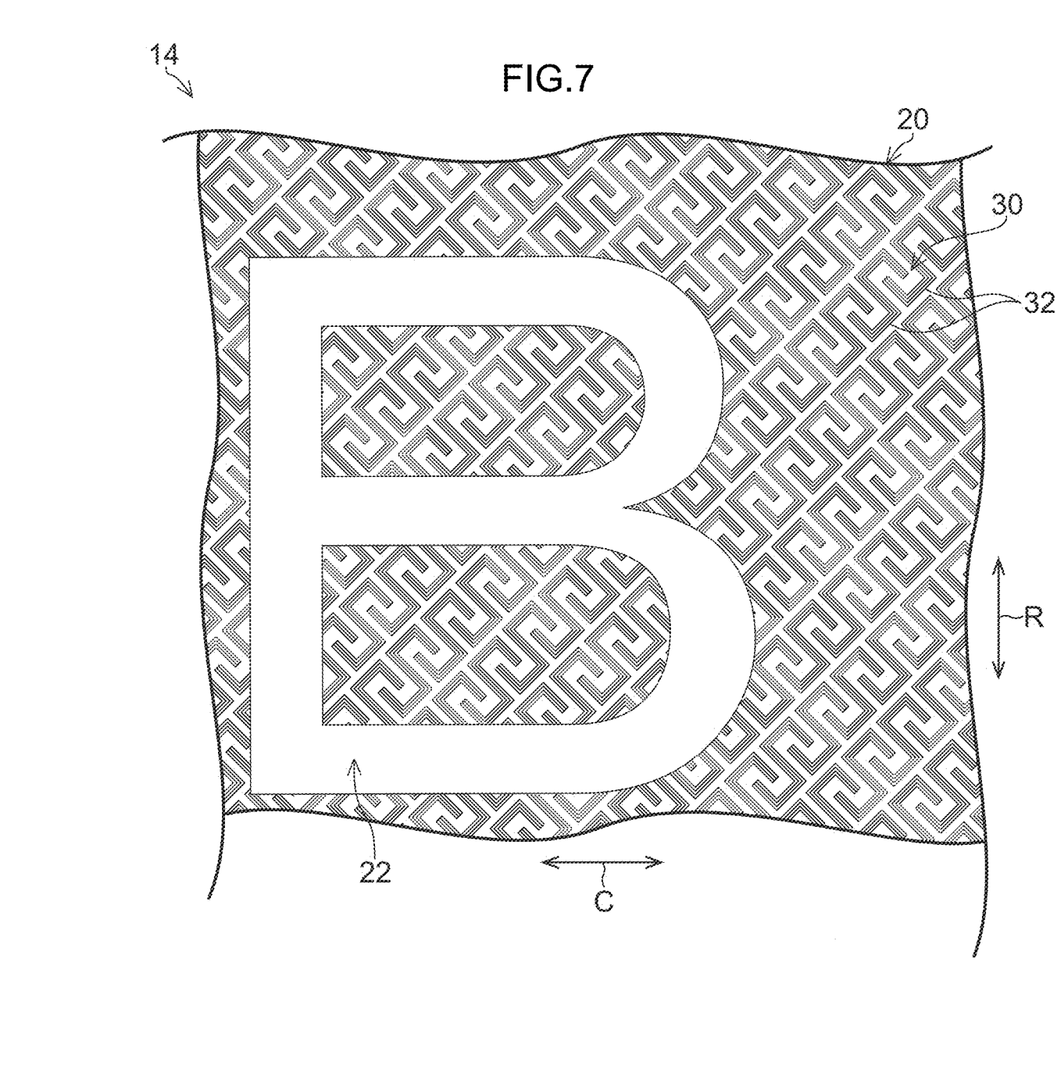
FIG. 7 is an enlarged plan view of a part of a mark portion of the tire according to the present embodiment.

In FIG. 7, a part of the first mark portion 14 is shown. A character constituting the bright portion 22 is constituted by a smooth surface and has gloss, and reflects light. The bright portion 22 is surrounded by the dark portion 20 which absorbs light to suppress the reflection of light. Therefore, the contrast is increased between the bright portion 22 reflecting light and the dark portion 20 absorbing light, whereby the visibility of the character displayed on the first mark portion 14 can be increased.

In addition, in the present embodiment, the base portion 32C is a portion at which the wall surface 32A which is a plane, and the step surface 12B which is a plane intersect each other, and is formed to be bent in a polygonal line shape when viewed from a cross section in a direction orthogonal to the extending direction of the ridge 32, but the embodiment of the disclosure is not limited thereto. For example, the base portion 32C may be formed so as to draw a curve line when viewed from the cross section in the direction orthogonal to the extending direction of the ridge 32. That is, the wall surface 32A and the step surface 12B may be connected by the base portion 32C having a curved shape. Alternatively, the step surface 12B may be formed in a curved line shape. The ridges 32 are formed as described above to suppress the reflection of the light, such that it is possible to increase the contrast of the pattern portion 30 to increase the visibility of the pattern portion 30.

Second Embodiment

Figure 4:
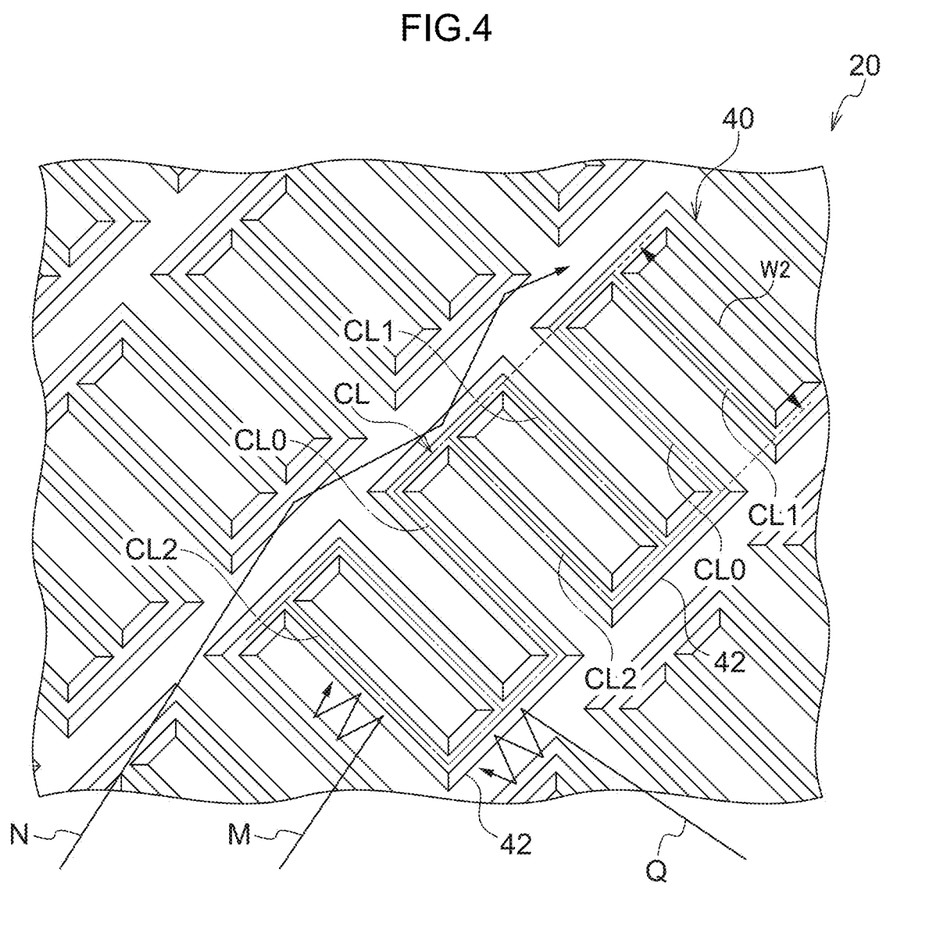
FIG. 4 is a plan view showing an example of a dark portion of a tire according to a second embodiment of the disclosure.

Next, a second embodiment of the disclosure will be described. The same reference numerals are given to the same components as those of the first embodiment, and a description thereof will be appropriately omitted. In FIG. 4, a dark portion 20 in the second embodiment is shown.

In the pattern portion 40 of the second embodiment, the first extending portion CL1 of the ridgeline CL of one of the ridges 42 adjacent to each other extends to the second extending portion CL2 of the other of the ridges 42 adjacent to each other along the main body portion CL0. In addition, the second extending portion CL2 of the other ridge 42 extends to the first extending portion CL1 of the one ridge 42 along the main body portion CL0. That is, the first extending portion CL1 of the one ridge 42 and the second extending portion CL2 of the other ridge 42 have an overlapping portion when viewed from the direction along the adjacent direction of the ridge, and the overlapping width W2 is equal to the total length dimension of the first extending portion CL1 and the second extending portion CL2 in the direction orthogonal to the direction in which the ridges 42 are adjacent. Further, the overlapping width W2 is equal to the dimension of the main body portion CL0. That is, the ridges 42 adjacent to each other are connected to each other. As described above, the pattern portion in the embodiment of the disclosure may have the configuration (for example, the ridge 32) in which a plurality of independent ridges are arranged adjacent to each other, and a configuration in which a plurality of repetitive minimum units (for example, the ridge 42) are connected to each other to be arranged adjacent to each other According to the pattern portion 40 of the second embodiment, for example, the ratio of the ridgeline extending in the direction orthogonal to the adjacent direction of the ridge is high as compared with the pattern portion 30 of the first embodiment. Therefore, the effect of attenuating light incident from the adjacent direction of the ridge 42 is enhanced. In this way, it is possible to adjust the attenuating effect of light by adjusting the lengths of the first extending portion CL1 and the second extending portion CL2. Also, it is possible to adjust the anisotropy of the attenuating effect.

Figure 5:
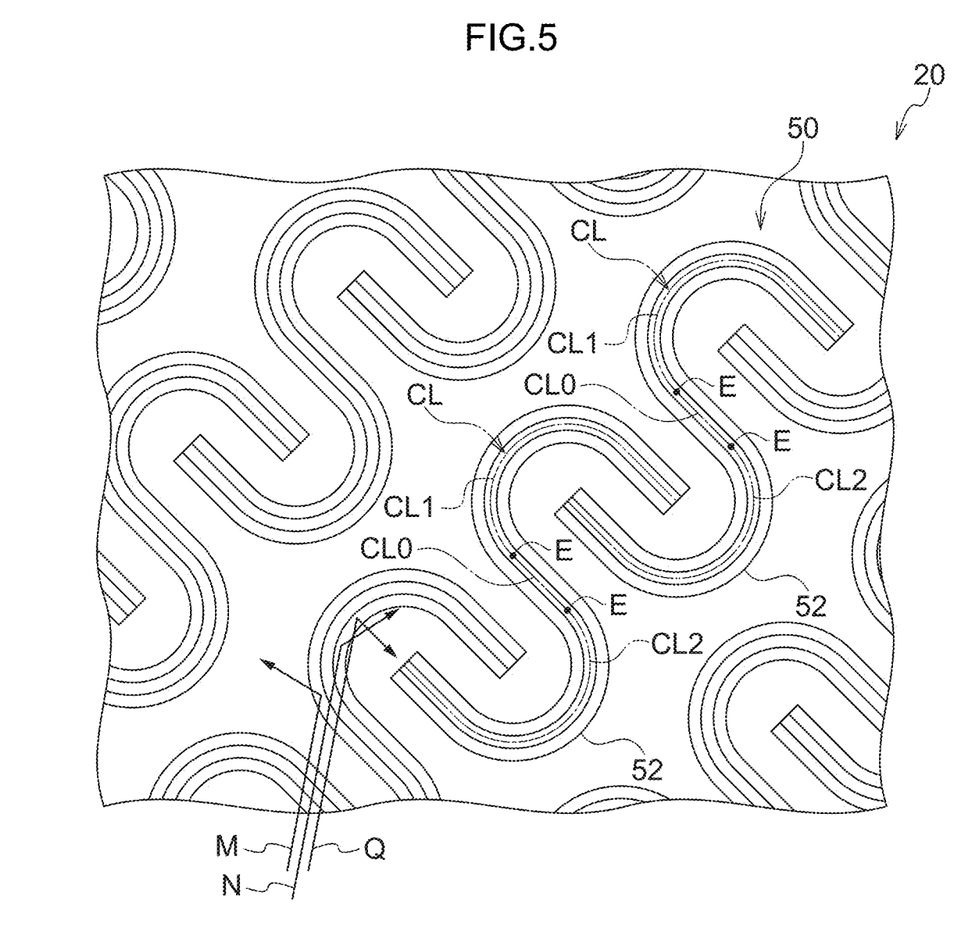
FIG. 5 is a plan view showing a modified example of the dark portion of the tire according to the embodiment of the disclosure.

In addition, in FIG. 5, a modified example of the embodiment of the disclosure is shown. As shown in FIG. 5, the first extending portion CL1 and the second extending portion CL2 in the ridgeline CL of a ridge 52 may have a curved portion. In this modified example, the main body portion CL0 is formed in a linear shape, and the first extending portion CL1 and the second extending portion CL2 extend from both end portions E of the main body portion CL0, respectively.

The first extending portion CL1 extends from one end E of the main body portion CL0 along an arc having the main body portion CL0 as a tangential line, and extends parallel to the main body portion CL0 from a location where a center angle of the arc is 180°. The second extending portion CL2 is formed to be point symmetrical with the first extending portion CL1 with respect to a center point O of the main body portion CL0.

In this way, since a part of the ridgeline CL of the ridge 52 is formed in a circular arc shape, as shown by arrows M, N, and Q in FIG. 5, it is possible to suppress the reflected light from concentrating in one direction by changing the reflection direction of light incident on the pattern portion 50. Therefore, it is possible to suppress variations in the intensity of the reflected light based on the difference in angle of the incident light.

The disclosure of Japanese Patent Application No. 2016-014573 filed on Jan. 28, 2016 is hereby incorporated by reference in its entirety. All documents, patent applications, and technical standards mentioned in the present specification are hereby incorporated by reference to the same extent as a case in which individual documents, patent applications, and technical standards are specifically and individually indicated to be hereby incorporated by reference.

The invention claimed is:

1. A tire comprising:
a pattern portion comprising a plurality of rows of ridges that each comprise a plurality of ridges arranged adjacent to each other on a tire surface along an adjacent direction of the ridges, each of the plurality of ridges including a main body portion and a first extending portion and a second extending portion that extend in different directions from the main body portion in plan view, wherein:
the plurality of rows of ridges are spaced from each other in a direction orthogonal to the adjacent direction of the ridges,
the first extending portion of one of the ridges and the second extending portion of an adjacent one of the ridges at least partially overlap each other when viewed from the direction orthogonal to the adjacent direction of the ridges, and
a height of the ridges is from 0.2 mm to 0.5 mm, and ridgelines of ones of the ridges adjacent to each other are arranged at a constant pitch in the adjacent direction of from 0.15 mm to 0.35 mm.

2. The tire according to claim 1, wherein an angle formed by wall surfaces that form one of the ridges and face each other is from 15° to 40°.

3. The tire according to claim 2, wherein the first extending portion of one of the ridges and the second extending portion of an adjacent one of the ridges at least partially overlap each other when viewed from a direction along the adjacent direction of the ridges.

4. The tire according to claim 2, wherein the first extending portion and the second extending portion each have a bending point and extend in opposite directions from each other from the respective bending points to respective tips.

5. The tire according to claim 1, wherein the first extending portion of one of the ridges and the second extending portion of an adjacent one of the ridges at least partially overlap each other when viewed from a direction along the adjacent direction of the ridges.

6. The tire according to claim 5, wherein the first extending portion and the second extending portion each have a bending point and extend in opposite directions from each other from the respective bending points to respective tips.

7. The tire according to claim 1, wherein the first extending portion and the second extending portion each have a bending point and extend in opposite directions from each other from the respective bending points to respective tips.

8. The tire according to claim 1, wherein:
the plurality of ridges of each of the plurality of rows of ridges are separate and spaced from each other, and
the pitch is the smallest distance between the ridgelines of the adjacent ridges in the adjacent direction.

9. The tire according to claim 8, wherein, in the adjacent direction, the first extending portion of the ridge is located so as to be between the second extending and main body portions of the adjacent ridge.

\* \* \* \* \*